United States Patent [19]

Ishizaka et al.

[11] 4,134,661
[45] Jan. 16, 1979

[54] EXPOSURE INDICATING DEVICE IN A SINGLE LENS REFLEX CAMERA HAVING A BUILT-IN TTL EXPOSURE METER

[75] Inventors: Sunao Ishizaka; Yasuhito Kawahara, both of Tokyo, Japan

[73] Assignee: Nippon Kogaku K.K., Tokyo, Japan

[21] Appl. No.: 754,170

[22] Filed: Dec. 27, 1976

[30] Foreign Application Priority Data

Dec. 29, 1975 [JP] Japan .......................... 50-180390[U]

[51] Int. Cl.² ............................................. G03B 17/00
[52] U.S. Cl. .................................... 354/289; 354/53; 354/219
[58] Field of Search .................................. 354/53–57, 354/155, 106, 219, 224, 225, 289, 152

[56] References Cited

U.S. PATENT DOCUMENTS

| 3,791,273 | 2/1974 | Beach .................................... 354/53 |
| 4,001,850 | 1/1977 | Fujita .................................. 354/106 X |
| 4,034,392 | 7/1977 | Ishizaka et al. ..................... 354/53 X |

Primary Examiner—John Gonzales

Attorney, Agent, or Firm—Fitzpatrick, Cella, Harper & Scinto

[57] ABSTRACT

An exposure indicating device for a single lens reflex camera having a built-in TTL exposure meter to indicate photographic information on photographic information members within a view finder with the help of external light, and having an eye-piece shutter to intercept the view finder optical system at its eye-piece section, wherein there are further provided a light emitting element at a position at which the photographic information members can be illuminated for indication within the view finder, and at which the light emitting element is able to emit light outside the camera body; and change-over means which is interlocked with opening and closing of the eye-piece shutter to connect the light emitting element to a power source through switching means operable from outside, when the eye-piece shutter is open, and to connect the light emitting element to the power source through an exposure measurement circuit of the TTL exposure meter, when the eye-piece shutter is closed.

6 Claims, 2 Drawing Figures

EXPOSURE INDICATING DEVICE IN A SINGLE LENS REFLEX CAMERA HAVING A BUILT-IN TTL EXPOSURE METER

BACKGROUND OF THE INVENTION

1. Field of the Invention

This invention relates to an exposure indicating device for a single lens reflex camera having a built-in TTL (through-the-lens) exposure meter which is capable of indicating photographic information (shutter speed, lens aperture value, propriety in exposure, etc.) within and outside a view finder region.

2. Description of the Prior Art

In a single lens reflex camera having a built-in TTL exposure meter, since a light receiving element for an exposure measurement circuit is inserted in the light path of a view finder, it can occur that the light receiving element is influenced by an inverse incident light through an eye-piece lens, wherefor a proper exposure measurement cannot be realized. In order to intercept such undesirable inverse incident light, it has been proposed to provide an eye-piece shutter in the photographic camera. In this type of camera, when the eye-piece shutter is closed, the view finder interior is unable to be seen with the consequence that it becomes unnecessary to effect the exposure indication within the view finder, but rather, it becomes necessary to effect the exposure indication outside the view finder region.

Also, when the photographic information is to be indicated within the view finder by utilization of external light, it may not be seen because of darkness due, as a matter of course, to shortage in the amount of such external light. Incidentally, this external light does not affect the exposure measurement circuit.

SUMMARY OF THE INVENTION

We have conceived and contribute, by the present invention, an exposure indicating apparatus which is capable of verifying the exposure conditions outside the view finder, when a photographer uses (or closes) the eye-piece shutter, and which is capable of verifying the photographic information within the view finder even in a dark place, when the eye-piece is not used.

There has thus been outlined rather broadly the more important features of the invention in order that the detailed description thereof that follows may be better understood and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

BRIEF DESCRIPTION OF THE DRAWINGS

Specific embodiments of the invention have been chosen for purposes of illustration and description and are shown in the accompanying drawings forming a part of the specification wherein.

DESCRIPTION OF THE PREFERRED EMBODIMENTS

In the following, the present invention will be explained in reference to the accompanying drawings.

Figure 1:
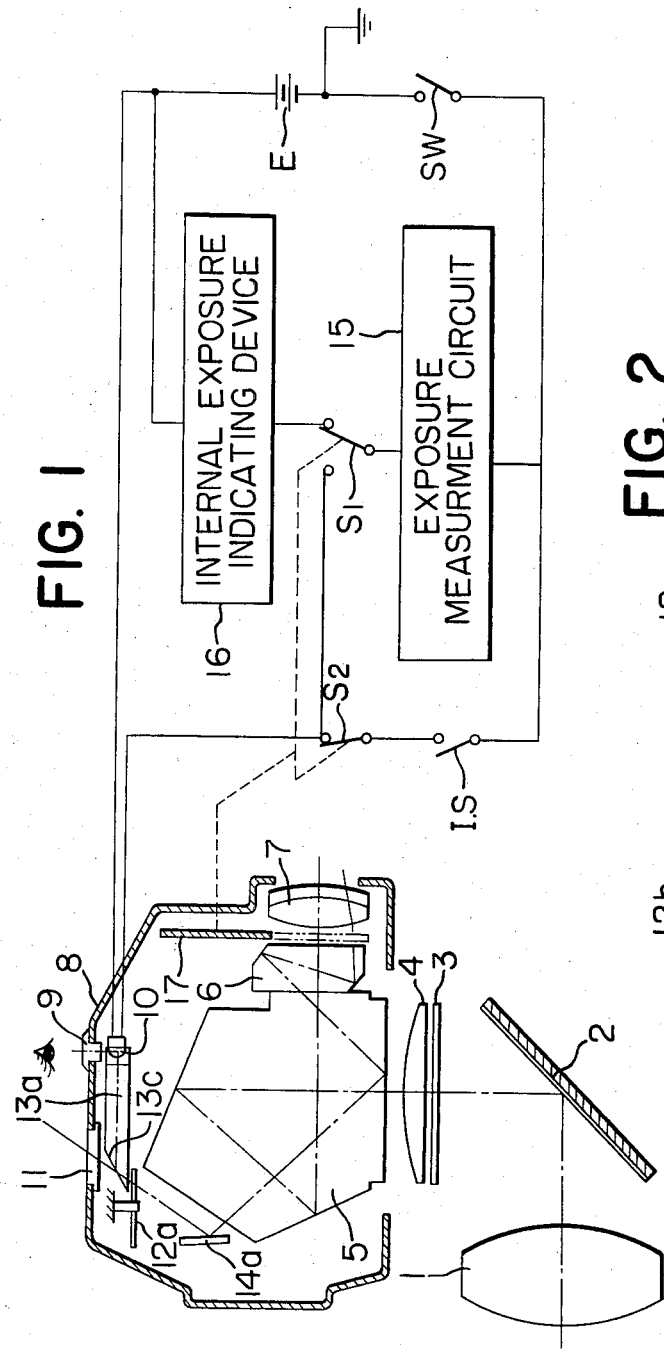
FIG. 1 is a longitudinal cross-section of a view finder portion of a photographic camera according to an embodiment of the present invention.

Referring to FIG. 1 which is a longitudinal cross-section of a pentaprism portion of a photographic camera, an image of an object to be photographed which has passed through a photographic lens 1 and has been reflected by a mirror 2 at a right angle travels through a known optical system consisting of a focusing screen 3, a condenser lens 4, a pentaprism 5, a reflection prism 6 for indication, and an eye-piece lens 7, and reaches a photographer's eye.

Figure 2:
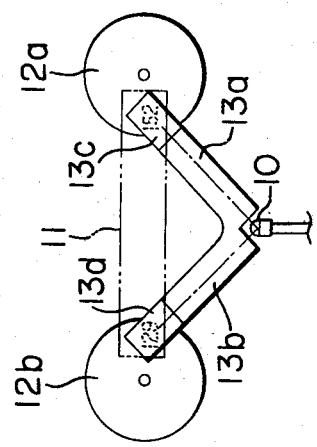
FIG. 2 is a plan view of a photographic information containing portion thereof.

On the top surface of a cover 8 for the main body of the pentaprism portion, there is provided a window 9 for the exposure indication outside the view finder, beneath which a light emitting element 10 such as L.E.D. (light emitting diode) etc. is disposed. Further, there is mounted on this top cover 8 a light introducing window 11, beneath which there are disposed, as shown in FIG. 2, a shutter speed dial plate 12a and an aperture value dial plate 12b, both being the photographic information containing members. Both dial plates are respectively interlocked with a shutter speed dial and an aperture ring (both now shown). Between each dial plate 12a, 12b and the light emitting element 10, there is provided a light guide 13a, 13b made of acrylic resin etc. The tip end of each light guide to the side of the dial plate is shaped in an inclined surface 13c, 13d so that external light from the light introducing window 11 and artificial light from the light emitting element 10 may travel along one and the same light path. As shown in FIGS. 1 and 2, the external light from the light introducing window 11 transmits through the inclined surface 13c of the light guide 13a and is led to a reflection mirror 14a for indication. The light guide 13a should therefore be made of a material that transmits light therethrough. The light path of the artificial light from the light emitting element 10 is reflected at the inclined surface 13c of the light guide 13a, and becomes coincident with the light path of the abovementioned external light. It should be noted here that, although in FIG. 1 only the reflection mirror 14a for indicating shutter speed is shown, there is actually provided another reflection mirror for indicating aperture value. These two reflection mirrors for indication are disposed to introduce light passed through the respective dial plates 12a and 12b into the pentaprism 5. A known type of exposure measurement circuit 15 is connected to a power source E through a power source switch SW, and is selectively connected either to the light emitting element 10, or to an internal exposure indication device 16 which indicates the state of exposure, i.e. proper exposure, overexposure, or under-exposure, through a first change-over switch $S_1$. An illuminator switch I.S. connected to the power source E through the power switch SW, is connected at its other end to the light emitting element 10 through a second change-over switch $S_2$. These first and second change-over switches $S_1$ and $S_2$ are changed over in accordance with movement of an eye-piece shutter 17 which slides up and down between the eye-piece lens 7 and the reflection prism 6 for indication. The eye-piece shutter 17 is moved up and down by a member (not shown) operable from outside the camera body.

The operation of the exposure indicating device according to the present invention will now be explained.

FIG. 1 shows a state wherein the eye-piece shutter is open. In this case, the first change-over switch S₁ connects the exposure measurement circuit 15 and the internal exposure indicating device 16 to constitute a closed circuit, while the second changeover switch S₂ connects the illuminator switch I.S. and the light emitting element 10 to constitute another closed circuit.

When the power source switch SW is closed, electric power is supplied to the exposure measurement circuit 15 from the power source E, and the internal exposure indicating device 16 is thereby caused to indicate a state of exposure in the view finder. The internal exposure indicating device 16 is so constructed that it is capable of indicating propriety of the exposure by means of L.E.D., and so forth (not shown). Also, when the illuminator switch I.S. is closed, while the power source switch SW is closed, electric power is supplied to the light emitting element 10 from the power source E, whereby the light emitting element 10 emits light. The light from this light emitting element 10 enters into the light guides 13a and 13b and is reflected at their respective inclined surfaces 13c and 13d to illuminate both dial plates 12a and 12b. The light transmitted through the dial plates takes the same light path as that of the external light introduced through the light introducing window 11, and then enters into the pentaprism 5 through the reflection mirror 14 for indication. Thereafter, it passes through the reflection prism 6 and the eye-piece 7 to reach the photographer's eye. Therefore, when it becomes impossible to indicate the photographic information within the view finder by illuminating these photographic information plates with external light, the abovementioned illuminator switch I.S. is closed to make it possible that the photographic information illuminated by the light emitting element 10 can be indicated in the view finder range.

Next, when the eye-piece shutter is closed, the first changeover switch S₁ is switched from the side of the internal exposure indicating device 16 to the side of the light emitting element 10 by the closing action of the eye-piece shutter, while the second change-over switch S₂ is switched to the "off" side, whereupon there is formed a closed circuit consisting of the light emitting element 10, the exposure measurement circuit 15, the power source switch SW, and the power source E. In this circuit, when the power source switch SW is closed, the exposure measurement circuit 15 is actuated and the light emitting element 10 emits light when a proper exposure is attained. The light from this light emitting element 10 passes outside through the window 9. The second changeover switch S₂, for the purpose of preventing the illuminator switch I.S. from being turned on erroneously to cause the light emitting element 10 to emit light, while the eye-piece shutter is in a closed state, is interlocked with the eye-piece shutter to be switched over to the "off" side to break the contact between the light emitting element 10 and the illuminator switch I.S.

According to the present invention as explained in the foregoing, the photographic informations can be verified even in a dark place when the eye-piece shutter is open. When the eye-piece shutter is closed, the exposure state can be verified outside the view finder.

Also, the light illuminating element serves as both illuminating member the photographic information and member for exposure indication outside the view finder, the change-over operation of which is done by the opening and closing of the eye-piece shutter. Consequently, the number of parts to be used can be reduced, which can obviate any complication and erroneous operation in photography.

We believe that the construction and operation of our novel exposure indicating device will now be understood and that the advantages thereof will be fully appreciated by those persons skilled in the art.

We claim:

1. In a single lens reflex camera having a body and a built-in TTL exposure meter: shutter means provided in a manner movable by external manipulation between a position to intercept inverse incident light from an eye-piece of a view finder into the view finder interior and a position retracted from said interception position; at least one photographic information carrying means; a light introducing window provided in a camera body to illuminate said photographic information carrying means with external light; means for leading said photographic information illuminated by external light through said light introducing window into the view finder eye-piece; and a light emitting element provided within the camera body to emit light in response to an output from an exposure measurement circuit and to indicate propriety of the exposure state, the improvement comprising:

(a) an indication window provided in the camera body for leading light emitted from said light emitting element outside the camera body;

(b) guide means to guide said emitted light in the direction substantially identical with that for illuminating said photographic information carrying means with said external light, and in a manner to illuminate said photographic information carrying means with said emitting element; and (c) first change-over means interlocked with said shutter means to be changed over between a first position to connect said exposure measurement circuit to said light emitting element when said shutter means is at the light intercepting position and a second position to disconnect said exposure measurement circuit from said light emitting element when said shutter means is at its retracted position.

2. The improvement according to claim 1, further comprising second change-over means interlocked with said shutter means, said second change-over means being opened when said shutter means is at its light intercepting position and being closed when said shutter means is at its retracted position, third change-over means capable of being opened and closed by an external operation, the closure of said third change-over means, when said second change-over means is closed, causing said light emitting element to emit light to illuminate said photographic information.

3. The improvement according to claim 1, wherein said light guide means is made of a transparent material, and formed with an inclined surface at one end thereof, which transmits said external light and totally reflects said emitted light, said inclined surface being provided in the light path for said external light, and being so constructed that it may project the reflected light of said emitted light in a direction substantially the same as that of said transmitted light.

4. The improvement according to claim 2, wherein said light guide means is made of a transparent material, and formed with an inclined surface at one end thereof, which transmits said external light and totally reflects said emitted light, said inclined surface being provided in the light path for said external light, and being so constructed that it may project the reflected light of said emitted light in a direction substantially the same as that of said transmitted light.

5. The improvement according to claim 3, wherein said light guide means is made of acrylic resin.

6. The improvement according to claim 4, wherein said light guide means is made of acrylic resin.

* * * * *